US012578302B2

(12) United States Patent
Saitta et al.

(10) Patent No.: US 12,578,302 B2
(45) Date of Patent: Mar. 17, 2026

(54) ELECTROCHEMICAL ANALYSIS OF METALLIC DEPOLARIZERS IN GOLD ELECTRODEPOSITION

(71) Applicant: ECI TECHNOLOGY, INC., Totowa, NJ (US)

(72) Inventors: Patrick Saitta, New York, NY (US); Jingjing Wang, Livingston, NJ (US); Eugene Shalyt, Washington Township, NJ (US)

(73) Assignee: ECI TECHNOLOGY, INC., Totowa, NJ (US)

( * ) Notice: Subject to any disclaimer, the term of this patent is extended or adjusted under 35 U.S.C. 154(b) by 351 days.

(21) Appl. No.: 18/150,396

(22) Filed: Jan. 5, 2023

(65) Prior Publication Data

US 2023/0280305 A1 Sep. 7, 2023

Related U.S. Application Data

(60) Provisional application No. 63/316,254, filed on Mar. 3, 2022.

(51) Int. Cl.
G01N 27/416 (2006.01)
C25D 3/48 (2006.01)
(Continued)

(52) U.S. Cl.
CPC ........... G01N 27/4161 (2013.01); C25D 3/48 (2013.01); C25D 21/12 (2013.01); G01N 27/4163 (2013.01)

(58) Field of Classification Search
CPC ........... G01N 27/4161; G01N 27/4163; G01N 27/42; G01N 33/1813; C25D 3/48; C25D 21/12
See application file for complete search history.

(56) References Cited

U.S. PATENT DOCUMENTS 4,067,783 A * 1/1978 Okinaka ................ C25D 17/10
205/268
4,336,111 A * 6/1982 Graunke ................ G01N 27/42
205/793.5

(Continued)

FOREIGN PATENT DOCUMENTS

CN 102313770 A 1/2012
CN 113984861 A 1/2022
(Continued)

OTHER PUBLICATIONS

Isshiki et al., "Polarography. II. Derivative Polarography of Cadmium, Antimony, and Lead Ions.", Pharm Bull. Sep. 1954;2(3):263-5. doi: 10.1248/cpb1953.2.263. (Year: 1954).*

(Continued)

*Primary Examiner* — Alexander S Noguerola
(74) *Attorney, Agent, or Firm* — Baker Botts L.L.P.

(57) ABSTRACT

The present disclosure provides methods for determining concentration of various trace metal ions in aqueous solutions, such as gold plating solutions. At a particular fixed reduction potential, the cathodic current can suddenly increase in magnitude after a certain period of time (e.g., an incubation time) passes in the presence of a trace metal ion (e.g., Tl(I)), where the incubation time is inversely proportional to the concentration of trace metal in the electrolyte. The concentration of the trace metal can be calculated after measuring the incubation time and comparing it against a calibration curve.

10 Claims, 5 Drawing Sheets

(51) Int. Cl.
  C25D 21/12       (2006.01)
  G01N 33/18       (2006.01)

(56)       References Cited

U.S. PATENT DOCUMENTS

| | | | | |
|---|---|---|---|---|
| 4,805,624 | A * | 2/1989 | Yao | G01N 27/3277 |
| | | | | 600/377 |
| 2003/0173224 | A1 | 9/2003 | Graham et al. | |
| 2004/0026266 | A1 * | 2/2004 | Atkinson | C12Q 1/004 |
| | | | | 204/403.02 |
| 2009/0107217 | A1 | 4/2009 | Huang | |
| 2013/0264222 | A1 * | 10/2013 | Bae | G01N 27/4118 |
| | | | | 204/406 |
| 2019/0227025 | A1 * | 7/2019 | Ross | G01N 27/4045 |
| 2020/0347510 | A1 | 11/2020 | Sun et al. | |

FOREIGN PATENT DOCUMENTS

| | | |
|---|---|---|
| KR | 10-1364647 B1 | 2/2014 |
| KR | 10-1691949 B1 | 1/2017 |

OTHER PUBLICATIONS

EPO machine-generated English language translation of CN 113984861 A, patent published Jan. 8, 2022 (Year: 2022).*

International Search Report and Written Opinion mailed Jun. 13, 2023 in International Application No. PCT/US2023/013658.

Supplementary European Search Report dated Jun. 2, 2025 in Application No. EP 23763825.

Vepsäläinen et al., "Cu2+, Fe2+and Fe3+analysis of bioleaching solutions using chronoamperometry and BDD electrode," Journal of Applied Electrochemistry, 44(10):1135-1143 (2014).

* cited by examiner

ELECTROCHEMICAL ANALYSIS OF METALLIC DEPOLARIZERS IN GOLD ELECTRODEPOSITION

CROSS-REFERENCE TO RELATED APPLICATIONS

This application claims the benefit, under 35 U.S.C. § 119(e), of U.S. Provisional Patent Application No. 63/316,254, filed Mar. 3, 2022, which is incorporated herein by reference.

FIELD

The present disclosure relates to methods for determining concentration of various trace metal ions in aqueous solutions.

BACKGROUND

Gold (Au) electrodeposition is widely used in electronics and general metal finishing for decorative and functional coatings. Au deposit has excellent corrosion characteristics. Electrical contact can be provided through mechanical apparatus, soldering, and wire-bonding. One formulation of Au electrodeposition bath includes high level, i.e., in the range of g/l of Au salt, complexing agents, buffering agent, surfactant, polarizer, and other components as well as low level, i.e., in the range of ppm of metal additives that serve as cathode depolarizer and improve the grain sizes of the deposition. Several elements have been investigated, including As, Bi, Cd, Cu, Ga, Hg, Pb, Sb, Sn, Tl, Zn, Te, SeCN(–).

Arsenic salt was used for a grain refiner, with thallium salts later employed as safer alternatives to cyanide and sulfite electrolytes. $Tl^+$ at ppm level exhibits accelerated deposition (i.e., depolarization) in the voltammetry of gold deposition. Gold electrodeposition can be constrained by forming inhibiting species (such as $SO_3^{2-}$ in gold sulfite bath), and the $Tl^+$ adsorption on the surface can lift the inhibition, thus destabilizing the gold complexes. The concentration and transport dependence on hysteretic voltammetry and rising chronoamperometric transients manifest the adsorption. The amount of these metal additives must be controlled within process limits to achieve good process performance.

Besides the application in gold electrodeposition, thallium is also used in the pharmaceutical industry, glass manufacturing, and infrared detectors. However, it is also a well-known neurotoxin, a pollutant of the environment and was included in the list of 129 so-called "priority pollutants" by the US Environmental Protection Agency. Although both thallium (I) and thallium (III) oxidation states are toxic, compounds of thallium (I) are comparatively more toxic and reactive. The solubility of the two ions is also different, as thallium (I) is soluble in water, while thallium (III) is not. It is therefore important to have quantitative analytical methods for Tl, especially in diverse samples and in trace amounts.

Certain methods have been proposed for the determination of thallium ions. Spectrophotometric methods can be attractive due to the availability of spectrophotometric instruments and the simplicity of these analytical procedures. Certain of these methods are based on the ability of the anionic chloro- or bromo-complex of thallium (III) to interact with cationic dyes to form ion association complexes, which can be extracted by organic solvents. Examples of such chromogenic reagents include brilliant green, pyronin G, 9,10-phenanthaquinone monoethylthiosemicarbazone, metheomebrazine hydrochloride, N,N-diphenyle benzamidine, and rhodamine B. Although the methods involving these reagents are sensitive, they can lack selectivity and thereby suffer from serious interference of foreign ions normally existing along with thallium in real samples, especially in plating samples where foreign ion levels are thousands of times higher than thallium.

In addition, if Tl(I) is present, it needs to be oxidized to the trivalent state with strong oxidants such as Ce(IV), bromine water, or hydrogen peroxide. As the presence of an excess of oxidants can destroy the cationic dye, they can be removed by boiling the solution (for hydrogen peroxide or bromine) or by adding hydroxylammonium chloride (for Ce(IV)). This boiling procedure makes the procedure more complex and time-consuming, being impractical for certain automatic monitoring for process control purposes.

Another method for determining thallium is cathodic and anodic stripping voltammetry (CSV). Certain CSV methods involve hanging mercury drop electrode or mercury thin film electrode, which studies the reduction of Tl(I) to metallic Tl. The measured signal can be very small and can only be observed on the mercury electrode due to the very low background current and sensitivity boost related to the formation of Tl amalgam. However, the use of mercury is largely prohibited in industrial laboratories due to its toxicity and difficulty for automatic maintenance-free applications.

Other electrode materials such as bismuth have gained interest as a replacement for mercury in detecting and quantifying heavy metals in samples. Bismuth can form alloys with other heavy metals such as thallium when they are reduced on its surface (at a sufficiently negative applied potential) or co-deposited. These processes can cause a detectable and quantifiable change in the current. However, it can require in-house engineering of the working electrodes and the employment of more complex electrochemical techniques, such as square wave/differential pulse anodic stripping voltammetry. Additionally, interference from dominant foreign metal ions such as gold can present a challenge.

Other methods for the determination of thallium ions include inductively coupled plasma mass spectrometry (ICP-MS), atomic absorption spectrometry (AAS), thermal neutron activation analysis, and electrothermal atomic absorption spectrometry. They can provide good selectivity and lower interference by high concentrations of foreign ions, but also expensive instruments, making these methods unrealistic for certain routine sample monitoring and automatic detection.

Certain methods of monitoring organic additives based on their catalytic/inhibitive effect on Cu electroplating are also known, with analytical methods based on the gradual decrease or the increase of the stripping peak area. However, this approach can be problematic for gold electroplating. Particularly, Au can be electrochemically deposited but cannot be electrochemically stripped from the surface of a platinum electrode from the same electrolyte. Additionally, the signal is not linear and has poor-reproducibility.

As such, there is a need in the art for simple and low-cost metrology for thallium and similar elements in the gold electrodeposition solution. Additionally, there is a need in the art for a method that can provide an accurate, fast, and easy-to-use method for the determination of trace levels of Tl(I) and similar elements in aqueous samples, especially in gold electroplating solutions where the gold level is often more than 1000 fold higher than the thallium level.

SUMMARY

The purpose and advantages of the disclosed subject matter will be set forth in and are apparent from the description that follows, as well as will be learned by practice of the disclosed subject matter. Additional advantages of the disclosed subject matter will be realized and attained by the devices particularly pointed out in the written description and claims hereof, as well as from the appended drawings.

To achieve these and other advantages and in accordance with the purpose of the disclosed subject matter, as embodied and broadly described, the disclosed subject matter includes a method for determining concentration of a metal ion. In certain embodiments, the method includes providing an aqueous solution comprising a first metal ion, performing a first amperometric scan to obtain a chronoamperometric voltammogram, calculating a first derivative of the chronoamperometric voltammogram, and calculating concentration of the metal ion by comparing the first derivative of the chronoamperometric voltammogram to a calibration curve.

In certain embodiments, the first metal ion is selected from As, Bi, Cd, Cu, Ga, Hg, Pb, Sb, Sn, Tl, Zn, Te, SeCN(-). In certain particular embodiments, the first metal ion is Tl(I).

In certain embodiments, the aqueous solution is a gold plating solution comprising gold (I) ions.

In certain embodiments, the concentration of the first metal ion is from about 0.1 to about 1000 ppm.

In certain embodiments, the ratio of the first metal ion to the gold (I) ions is from about 1:300 to about 1:5000.

In certain embodiments, the calibration curve is prepared by (i) providing a first test aqueous solution comprising a known concentration of the first metal ion; (ii) performing an amperometric scan to obtain a first test chronoamperometric voltammogram; (iii) calculating a first derivative of the first test chronoamperometric voltammogram; and optionally repeating (i)-(iii) using a test aqueous solution having a different concentration that the first test aqueous solution.

In certain embodiments, the aqueous solution includes sulfate ions, sulfite ions, or combinations thereof.

In certain embodiments, the method of the present disclosure further includes stripping plated metals from a working electrode.

In certain embodiments, the first amperometric scan is performed at a fixed potential of -0.6V for 30-300 seconds with a rotation speed of 1000-4000 rpm.

DETAILED DESCRIPTION

Figure 1:
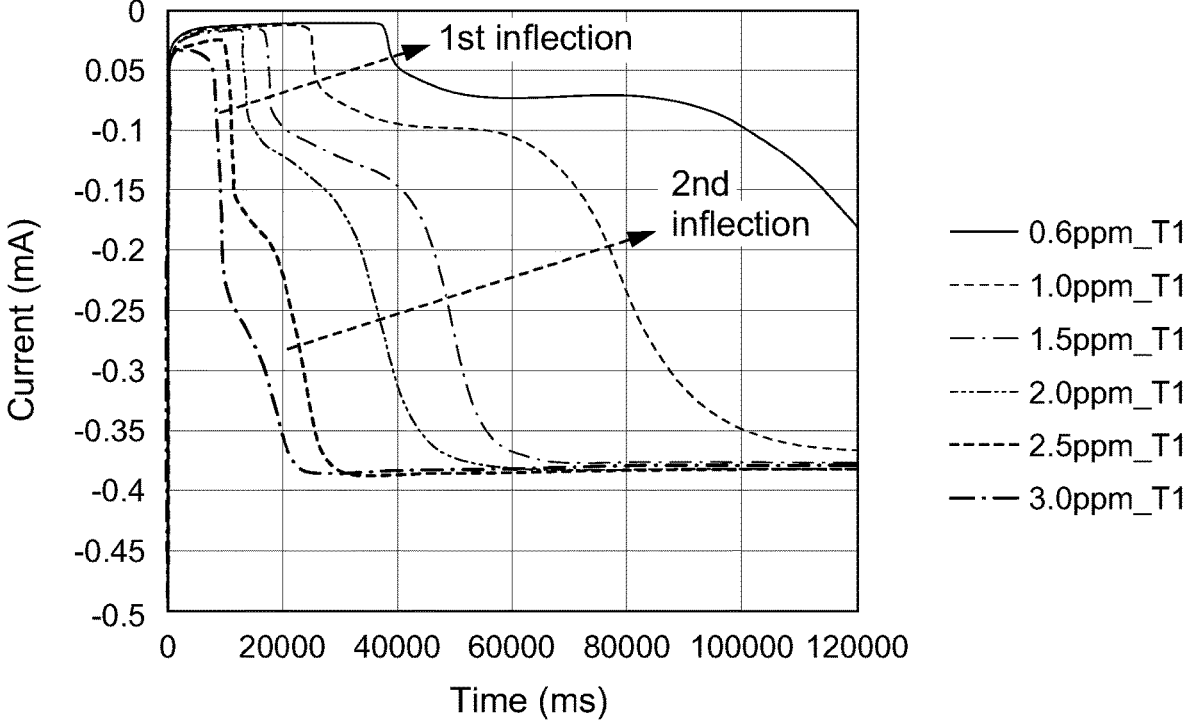
FIG. 1 shows a calibration curve used in certain embodiments of the present disclosure.

The present disclosure provides a method for determining a concentration of a metal ion. To address the foregoing needs, the present disclosure provides a method for determining trace levels of various metal ions in aqueous samples such as but not limited to gold plating solutions. As used herein, the "trace levels" include a range of from 0.1 ppm to 1000 ppm.

For clarity, but not by way of limitation, the detailed description of the presently disclosed subject matter is divided into the following subsections:

I. Definitions
II. Methods for Detecting Trace Ions

I. Definitions

The terms used in this specification generally have their ordinary meanings in the art, within the context of this disclosure and in the specific context where each term is used. Certain terms are discussed below, or elsewhere in the specification, to provide additional guidance to the practitioner in describing the compositions and methods of the present disclosure and how to make and use them.

For purposes of interpreting this specification, the following definitions will apply and whenever appropriate, terms used in the singular will also include the plural and vice versa. In the event that any definition set forth below conflicts with any document incorporated herein by reference, the definition set forth below shall control.

As used herein, the use of the word "a" or "an" when used in conjunction with the term "comprising" in the claims and/or the specification can mean "one," but it is also consistent with the meaning of "one or more," "at least one," and "one or more than one."

The terms "comprise(s)," "include(s)," "having," "has," "can," "contain(s)," and variants thereof, as used herein, are intended to be open-ended transitional phrases, terms or words that do not preclude additional acts or structures. The present disclosure also contemplates other embodiments "comprising," "consisting of" and "consisting essentially of," the embodiments or elements presented herein, whether explicitly set forth or not.

As used herein, the term "about" or "approximately" means within an acceptable error range for the particular value as determined by one of ordinary skill in the art, which will depend in part on how the value is measured or determined, i.e., the limitations of the measurement system. For example, "about" can mean within 3 or more than 3 standard deviations, per the practice in the art. Alternatively, "about" can mean a range of up to 20%, preferably up to 10%, more preferably up to 5%, and more preferably still up to 1% of a given value.

As used herein, the term "high level" when used in context of a concentration of a metal ion in a solution refers to a concentration in the range of grams per liter (g/L).

As used herein, the term "low level" when used in context of a concentration of a metal ion in a solution refers to a concentration in the range of parts per million (ppm).

Grain refiner, as used herein, has its ordinary meaning in the art of electroplating, i.e., it is additive that helps to control electroplating process by being attracted to "high points" on the plated surface. Left untreated, the high points would tend to attract more metal deposition compared to lower points resulting in a rough surface. A grain refiner inhibits further deposition. As these points are replaced by other higher points the grain refiner will drift away and reposition itself.

The term "trace", as used herein, refers to a concentration less than 1000 ppm. In certain embodiments, trace levels refer to a concentration range of from 0.1 ppm to 1000 ppm.

The term chelated, as used herein, refers to a metal ion that is chemically bonded to an ion or a molecule by a coordinate bonding.

II. Methods for Detecting Trace Ions

The present disclosure provides an accurate, fast, and easy-to-use method for determining trace levels of various metal ions in aqueous samples. In certain embodiments, the trace metal ions are As, Bi, Cd, Cu, Ga, Hg, Pb, Sb, Sn, Tl, Zn, Te, SeCN(−). In certain embodiments, the trace metal ion is Tl. In certain embodiments, the trace metal ion is Tl(I).

In certain embodiments, the aqueous sample is a gold electroplating solution. In certain embodiments, the gold level is more than 1000-fold higher than the level of the trace metal ion, such as but not limited to Tl(I). As would be readily known by a person of ordinary skill in the art, the presence of gold ions in the solution interferes with detecting trace metal ions, such as Tl(I). In certain embodiments, the gold plating solution includes other species that can interfere with detecting trace metal ions, such as Tl(I), including sulfate ions ($SO_4^{2-}$), and sulfite ions ($SO_3^{2-}$).

The method of the present disclosure combines multiple elements to determine trace levels of various metal ions. In certain embodiments, the method includes deriving analytical signals from the electrodeposition experiments. Such a method contrasts with the methods known in the art that implement stripping as a part of the experiment. In certain embodiments, the method also includes the use of electrochemical etching for the electrode surface recovery in a separate electrolyte rather than electrochemical stripping from the same metal electrolyte for electrodeposition experiments. In certain embodiments, the method further includes deriving analytical signals based on the incubation time rather than suppression/acceleration ratio, as found in CVS methods commonly described in the art. In certain embodiments, the method disclosed herein is sensitive, selective, inexpensive, rapid, and free from various interfering ions. Furthermore, the presently disclosed method does not require procedures that are difficult to be automated, such as but not limited to organic solvent extraction or sample heating.

In certain embodiments, when the trace metal is detected in a gold electroplating solution, there are four (4) main cathodic reactions possible: generation of $H_2$ from hydronium ion, generation of $H_2$ from water, electrodeposition of the trace metal ion, and electrodeposition of gold. Each of these electrochemical reactions is shown below as equations 1-4. For purposes of illustration, the trace metal is Tl(I), but it can be any one of As, Bi, Cd, Cu, Ga, Hg, Pb, Sb, Sn, Zn, Te, and SeCN(−).

$$2H^+2e^- \rightarrow H_2 E_0 = 0V \tag{1}$$

$$2H_2O + 2e^- \rightarrow H_2 + 2OH^- E_0 = -0.83V \tag{2}$$

$$Tl^+ + e^- \rightarrow Tl E_0 = -0.34V \tag{3}$$

$$Au^+ + e^- \rightarrow Au E_0 = 1.691V \tag{4}$$

Although based on the reduction potential, the electrodeposition of Au(I) appears to be favorable, this metal ion is typically chelated, which shifts the reduction potential to the negative region. Therefore, only the evolution of hydrogen (as shown in Equations 1 and 2) and the trace metal ion's deposition on the electrode surface occur at the initial time of polarization. In certain embodiments, as shown in Equation 3, the trace metal ion is Tl(I). The rate of electrodeposition is mass-transport limited, and therefore, a rotating disc electrode is used to induce a flux of analyte to the electrode. The rate of electrodeposition of the metal ion, such as but not limited to Tl(I), is described by Levich equation (5) shown below:

$$I_L = (0.62)nFAD^{2/3}\omega^{1/2}v^{-1/6}C \tag{5}$$

$I_L$ is the Levich current, n is the number of moles of electrons transferred in the half reaction (number), F is the Faraday constant (C/mol), A is the electrode area ($cm_2$), D is the diffusion coefficient (see Fick's law of diffusion) ($cm^2$/s), ω is the angular rotation rate of the electrode (rad/s), v is the kinematic viscosity ($cm^2$/s), C is the analyte concentration ($mol/cm^3$). In this form of the equation, the constant with a value of 0.620 has units of $rad^{-1/2}$. It is noted that current (I) is proportional to the concentration of the trace metal and electrode surface area.

Faraday equation (6) provides that the mass of electrodeposited trace metal ion per electrode surface is proportional to its bulk concentration*time. If it is assumed that a monolayer of the trace metal is formed on the electrode, the surface coverage is also proportional to the bulk concentration*time.

$$m = zIt \tag{6}$$

In this equation, m is the mass of the electrodeposited metal, z is the electrochemical equivalent, I is the current and t is time.

It has unexpectedly been found that there is a critical value of the trace metal coverage at which the electrodeposition current suddenly accelerates under certain conditions (e.g., proper potential). The time to reach this critical surface coverage is referred to herein as "incubation time." Incubation time can be experimentally determined by the duration of time from the beginning of electroplating to the first derivative of the current reaching maximum absolute value in the amperometric scan. It is inversely proportional to the concentration of trace metal (e.g., Tl(I)) in the electrolyte. The present disclosure, therefore, provides a method of measuring the incubation time and correlating it to the concentration of the trace metal, such as, but not limited to Tl(I).

In certain embodiments, the present disclosure provides a method to measure trace metal ions, such as, but not limited to Tl(I) with error <5% and relative standard deviation (RSD)<3%.

In certain embodiments, after collecting a measurement, the electrode is covered with a film of electrodeposited metal, which should be removed to provide a clean surface thereby enabling a new round of sample analysis. This can be done by one or the combination of the following: mechanical removal, e.g., by polishing, chemical etching, and electrochemical etching method. In certain embodiments, it can be beneficial to perform chemical/electrochemical etching in a special etching solution rather than the analytical solution used for the analytical scan. Composition of such cleaning solution(s) can include one or more strong oxidizer (unless oxidation achieved electrochemically), and strong chelators to keep the etched metal soluble. Examples of strong oxidizers include but are not limited to aqua regia (a mixture of nitric acid and hydrochloric acid, optimally in a molar ratio of 1:3), and hydrogen peroxide. Examples of strong chelators suitable for the method of the present disclosure include but are not limited to thiocyanide and thiourea.

Although the method of measuring trace materials has been described in connection with gold plating solutions, it is also suitable for generic analysis of trace metal ions, such as but not limited to Tl, in other aqueous samples.

EXAMPLES

The presently disclosed subject matter will be better understood by reference to the following Example, which is provided as exemplary of the presently disclosed subject matter, and not by way of limitation.

Example 1: Detection of Tl(I) in Gold Plating Solution

Example 1 provides a protocol for determining Tl(I) concentrations in a gold plating solution according to certain embodiments of the present disclosure. Example 1 also describes the preparation of a calibration curve that can be used to determine the concentration of Tl(I) ions in an aqueous gold plating solution.

Au plating sample solution containing Tl(I) was added to a beaker with 25 mL of supporting electrolyte composed of 20-80 g/L of sulfite as in sodium sulfite (pH 6-10), and the solution was mixed. Three electrodes were prepared for an amperometric scan: a platinum rotating disk electrode, a stainless steel auxiliary electrode, and a Ag/AgCl reference electrode. The three electrodes were then placed in the beaker, and a first amperometric scan was performed at a fixed potential of −0.6V for a duration of 30-300 seconds with a rotation speed of 1000-4000 rpm. The electrodes were then removed from the beaker and cleaned with deionized water (DI water) twice. Au deposit on the Pt working electrode was removed by electrochemical oxidation in presence of thiocyanide chelator.

Incubation time (T_sample) was obtained by calculating the first derivative of the chronoamperometric voltammogram obtained from the first amperometric scan after noise reduction processing of the raw signal using filters such as the Savitzky—Golay filter. Tl(I) concentration was subsequently calculated based on T_sample against the calibration curve, which was prepared as described below.

Figure 2:
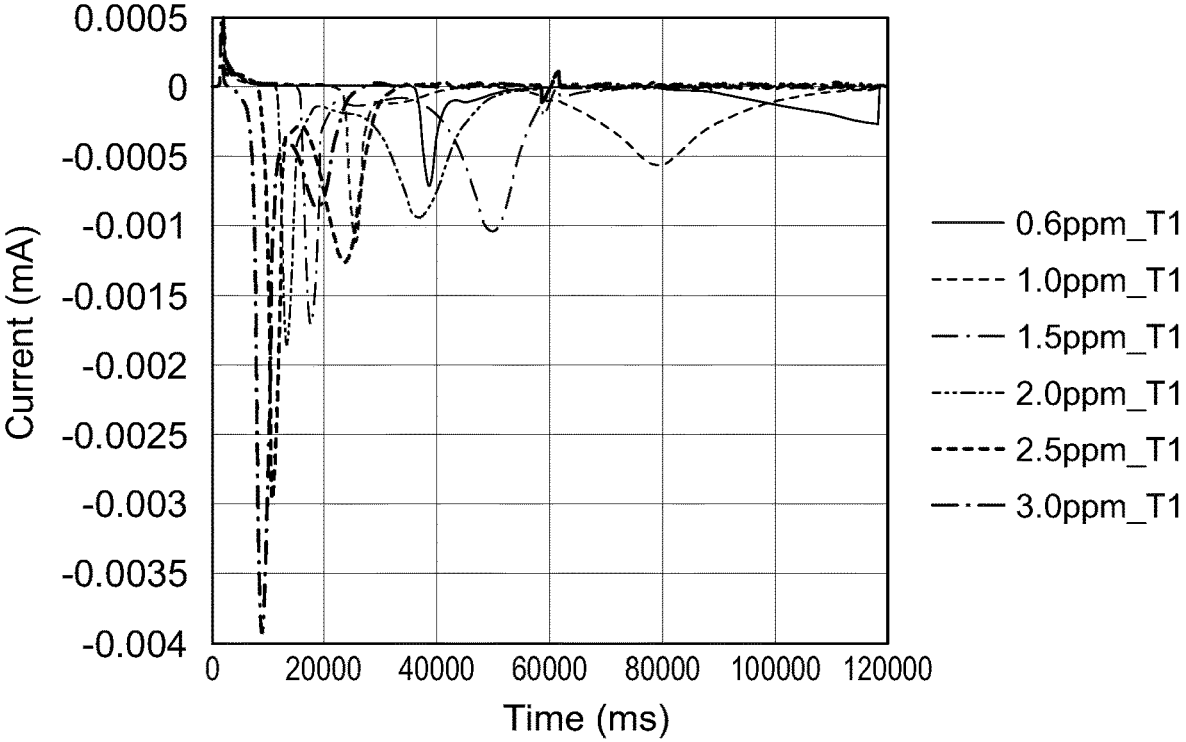
FIG. 2 shows first derivative of the chronoamperometric graph of FIG. 1.
Figure 3:
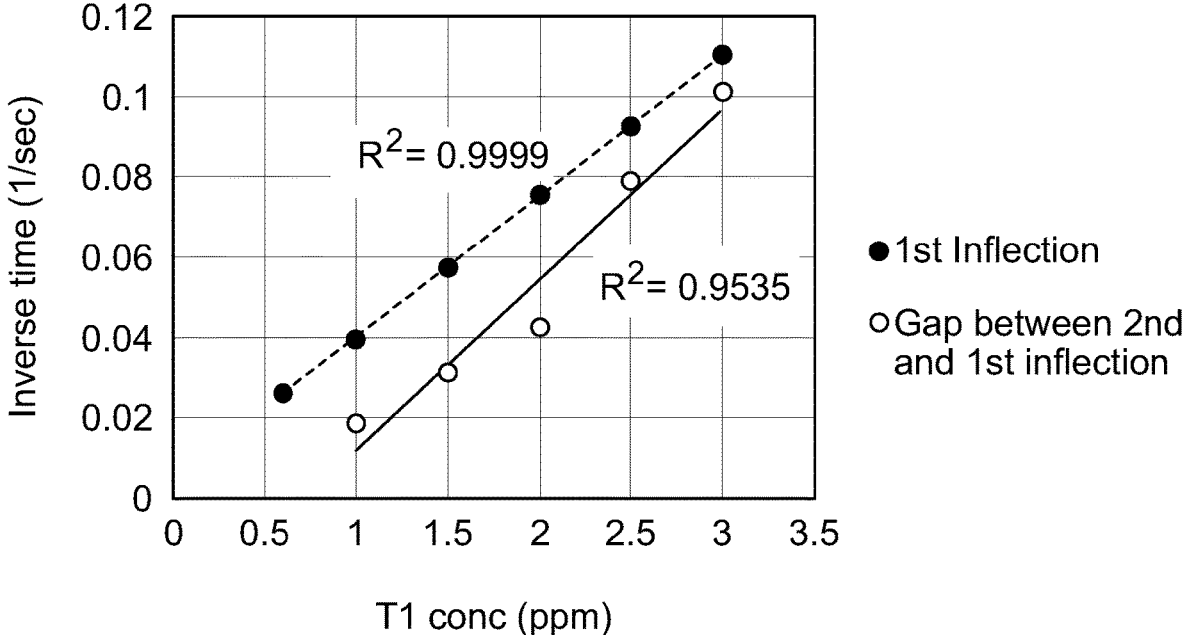
FIG. 3 illustrates a linear correlation of the inverse of the incubation time against Tl(I) concentration according to certain embodiments of the present disclosure.

The calibration curves were prepared by scanning samples containing known Tl(I) concentrations. TlNO$_3$ or Tl$_2$(SO$_4$) were used as sources for Tl(I) ions. A solution containing 25 mL of supporting electrolyte Na$_3$[Au(SO$_3$)$_2$] (Au=1 g/L) and Na$_2$SO$_3$ was combined with a test solution with Tl(I) ions. Platinum rotating disk electrode, stainless steel auxiliary electrode, and Ag/AgCl reference electrode were placed in the solution. An amperometric scan was performed at a fixed potential of −0.6V for 30 seconds with a rotation speed of 1000-4000 rpm. As shown in FIG. 1, the calibration curve is a linear regression curve of 1/T against Tl concentration in the supporting electrolyte. The accurate value of incubation time at the first inflection is obtained by the first derivative of the chronoamperometric graph as shown in FIG. 2. In certain embodiments, there are multiple inflections observed, which can be used in the calculation. In certain embodiments, the first inflection is used. As shown in FIG. 3, a linear correlation of the inverse of the incubation time determined by 1) first inflection and 2) the time difference between the 2nd and 1st inflections was seen against Tl(I) concentration after sample being added to supporting electrolyte. R-square was 0.9999 when first inflection is selected, therefore it is used in calibration and analysis.

After preparation of the calibration curves, five (5) samples were prepared as shown in Table 1:

TABLE 1

| Composition of standard samples tested | | | |
|---|---|---|---|
| Sample ID | Au, g/L (as in Na$_3$[Au(SO$_3$)$_2$] | [SO$_3$]$^{2-}$, g/L (as in Na$_2$SO$_3$) | Tl, ppm |
| Sample#1 | 13 | 20 | 20 |
| Sample#2 | 15 | 40 | 30 |
| Sample#3 | 17 | 90 | 40 |
| Sample#4 | 17 | 90 | 20 |
| Sample#5 | 13 | 20 | 40 |

Each of the samples was then tested as described above, and the results are shown in Table 2. As shown in Table 2, an additional sample was tested, including a composition as shown in the "Sample #2" sample spiked with a large amount of sulfate. As shown in Table 2, the measurement was not affected by the presence of sulfate ions, which is important since sulfate ions are the main byproducts of the gold sulfite plating bath, formed by the oxidation of sulfite ions.

TABLE 2

| Analysis results of standard samples. | | | | | | |
|---|---|---|---|---|---|---|
| | Sample #1 | Sample #2 | Sample #3 | Sample #4 | Sample #5 | Sample #2 spiked with 80 g/L SO$_4{}^{2-}$ |
| Expected, ppm | 20 | 30 | 40 | 20 | 40 | 30 |
| Measured #1, ppm | 19.43 | 30.50 | 38.80 | 19.18 | 38.77 | 30.04 |
| Measured #2, ppm | 19.85 | 30.66 | 40.46 | NA | NA | |
| Measured average, ppm | 19.64 | 30.58 | 39.63 | 19.18 | 38.77 | 30.04 |
| Accuracy | −1.79% | 1.93% | −0.92% | −4.08% | −3.08% | 0.13% |
| RSD | 1.49% | 0.38% | 2.96% | | | |

As shown in Table 2, the present method provided very accurate measurements of Tl(I) in the aqueous gold plating solution.

The process was then repeated with another sample ("Process Sample") of unknown Tl(I) concentration. Three samples were taken—the first sample was tested as it was (Process Sample (PS), the second sample was spiked with 10 ppm of Tl(I) ions (PS spiked with 10 ppm T1), and the third sample was 75% diluted with DI water (PS_75% diluted with DIW), as shown in Table 3.

TABLE 3

| Analysis results Process Sample, the Process Sample spiked with pure Tl(I) and the Process Sample diluted with DI water. | | | |
|---|---|---|---|
| | Process Sample (PS) | PS spiked with 10 ppm Tl | PS_75% diluted with DIW |
| Expected, ppm | NA | 42.48 | 24.36 |
| Measured, ppm | 32.48 | 42.86 | 24.26 |
| Accuracy | NA | 0.90% | −0.44% |

As shown in Table 3, the Process Sample was measured to have 32.48 ppm of Tl(I). The sample, which was spiked with 10 ppm of Tl(I), was measured to have a concentration of 42.86, which is about 0.90% difference from the expected. When the Process Sample was 75% diluted with DI water, the measured concentration was 24.26 ppm, which was only 0.44% different from the predicted 24.36 ppm.

Figure 4:
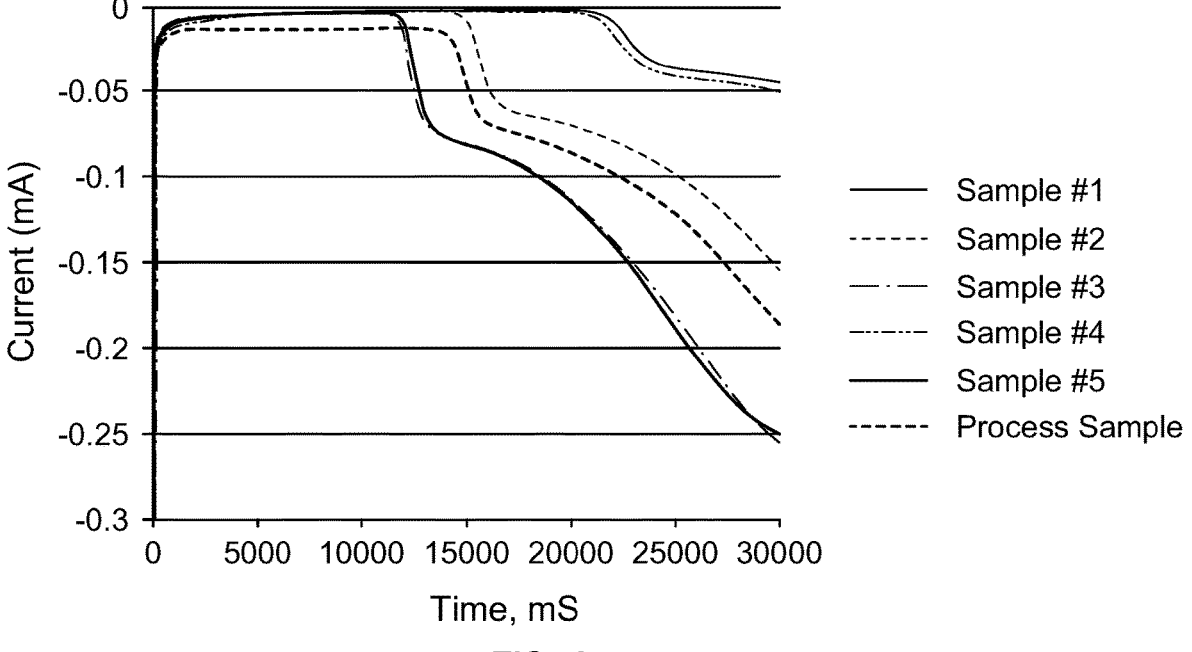
FIG. 4 shows chronoamperometry graphs from measurements taken according to certain embodiments of the present disclosure.
Figure 5:
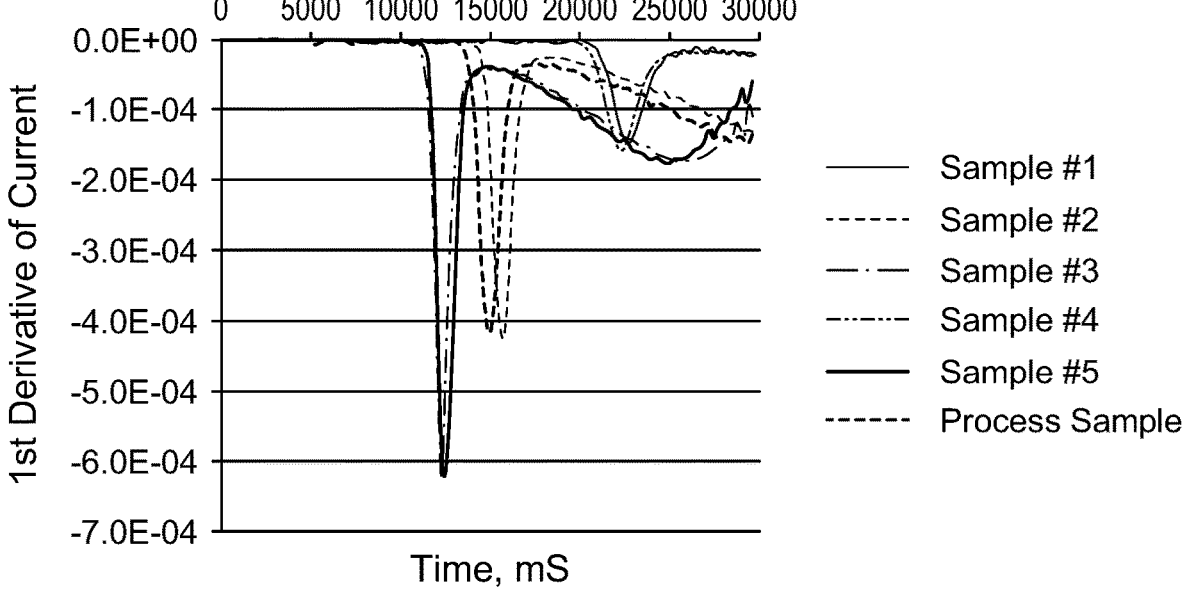
FIG. 5 shows a first derivative of the chronoamperometric graph of FIG. 4.

Chronoamperometry graphs and first derivatives thereof of the samples shown in Tables 2 and 3 are shown in FIGS. 4 and 5, respectively.

Table 4 shows the analysis results of a set of gold plating samples where the Au level variation in these samples was much larger than the sample set in Table 1, and Tl concentration was lower than in the samples shown in Table 1. The samples were tested using the procedure stated above. It was observed that the Au level in the sample affects the incubation time to a much smaller extent than Tl. It was found that a 75% variation of Au concentration in samples (Au range/ middle point value) caused a deviation of about 9% in the inverse of incubation time. When the Au variation is less than 45% in a set of samples, the analysis error is less than 5%; therefore, the effect of Au can be ignored. The example is the sample set in Table 1. Otherwise, the signal should be compensated based on the analytical result of Au.

Different approaches can be employed, such as adding a suitable amount of Au into the supporting electrolyte to keep the Au concentration constant across different samples or multivariant analysis with Au concentration as a variable in addition to the incubation time. The latter approach was applied in the $2^{nd}$ sample set in Table 4:

TABLE 4

| Analysis results of Samples with Increased Variation of Au Levels. | | | | | |
|---|---|---|---|---|---|
| | Sample#6 | Sample#7 | Sample#8 | Sample#9 | Sample#10 |
| Au prepared, g/L | 10 | 16 | 22 | 22 | 10 |
| Tl Expected, ppm | 5 | 12 | 20 | 5 | 20 |
| Tl Measured #1, ppm | 5.00 | 12.41 | 19.93 | 4.84 | 19.82 |
| Tl Measured #2, ppm | 5.15 | 12.33 | 20.21 | 4.79 | 19.65 |
| Tl Measured average, ppm | 5.08 | 12.37 | 20.07 | 4.81 | 19.73 |
| Accuracy | 1.58% | 3.11% | 0.36% | −3.76% | −1.33% |
| RSD | 2.07% | 0.45% | 1.00% | 0.68% | 0.61% |

Although the presently disclosed subject matter and its advantages have been described in detail, it should be understood that various changes, substitutions and alterations can be made herein without departing from the spirit and scope of the disclosed subject matter. Moreover, the scope of the present application is not intended to be limited to the particular embodiments of the process, machine, manufacture, and composition of matter, methods and processes described in the specification. As one of ordinary skill in the art will readily appreciate from the disclosed subject matter of the presently disclosed subject matter, processes, machines, manufacture, compositions of matter, methods, or procedures, presently existing or later to be developed that perform substantially the same function or achieve substantially the same result as the corresponding embodiments described herein may be utilized according to the presently disclosed subject matter. Accordingly, the appended claims are intended to include within their scope such processes, machines, manufacture, compositions of matter, methods, or procedures.

Various patents, patent applications, publications, product descriptions, protocols, and sequence accession numbers are cited throughout this application, the inventions of which are incorporated herein by reference in their entireties for all purposes.

What is claimed is:

1. A method for determining concentration of a metal ion, the method comprising:
   providing an aqueous solution comprising a first metal ion;
   performing a first amperometric scan on the aqueous solution to obtain a chronoamperometric voltammogram;
   calculating a first derivative of the chronoamperometric voltammogram;
   calculating the concentration of the metal ion by comparing the first derivative of the chronoamperometric voltammogram to a calibration curve.

2. The method of claim 1, wherein the first metal ion is selected from the group consisting of As, Bi, Cd, Cu, Ga, Hg, Pb, Sb, Sn, Tl, Zn, Te, and SeCN(−).

3. The method of claim 1, wherein the first metal ion is Tl(I).

4. The method of claim 1, wherein the aqueous solution is a gold plating solution comprising gold (I) ions, and the first metal ion is different than the gold (I) ions.

5. The method of claim 4, wherein the ratio of the first metal ion to the gold (I) ions is from about 1:300 to about 1:5000.

6. The method of claim 1, wherein the concentration of the first metal ion is from about 0.1 to about 1000 ppm.

7. The method of claim 1, wherein the calibration curve is prepared by:
   (i) providing a first test aqueous solution comprising a known concentration of the first metal ion;
   (ii) performing an amperometric scan to obtain a first test chronoamperometric voltammogram;
   (iii) calculating a first derivative of the first test chronoamperometric voltammogram; and
   repeating (i)-(iii), if needed, using a second test aqueous solution having a different concentration than that of the first test aqueous solution.

8. The method of claim 1, wherein the aqueous solution comprises sulfate ions, sulfite ions, or combinations thereof.

9. The method of claim 1, wherein the method comprises stripping plated metals from a working electrode.

10. The method of claim 1, wherein the first amperometric scan is performed at a fixed potential of −0.6V for 30-300 seconds using a rotating disk electrode with a rotation speed of 1000-4000 rpm.

\* \* \* \* \*